United States Patent [19]
Kawa

[11] Patent Number: 5,987,036
[45] Date of Patent: Nov. 16, 1999

[54] FRAME TRANSFER NORMALIZED PRIORITY

[75] Inventor: Claude Kawa, Montreal, Canada

[73] Assignee: Nortel Networks Corporation, Montreal, Canada

[21] Appl. No.: 08/929,774

[22] Filed: Sep. 15, 1997

Related U.S. Application Data

[60] Provisional application No. 60/028,858, Sep. 16, 1996.

[51] Int. Cl.$^6$ ........................................ H04J 3/16
[52] U.S. Cl. ............................................... 370/468
[58] Field of Search ...................... 370/465, 468, 370/389, 392, 399, 400, 401, 414, 416, 418, 444, 230, 412

[56] References Cited

U.S. PATENT DOCUMENTS

| | | | |
|---|---|---|---|
| 5,412,647 | 5/1995 | Giroux et al. | 370/232 |
| 5,600,798 | 2/1997 | Cherukuri et al. | 395/200.13 |
| 5,734,654 | 3/1998 | Shirai et al. | 370/401 |

FOREIGN PATENT DOCUMENTS

| | | | |
|---|---|---|---|
| 0 714 192 | 5/1996 | European Pat. Off. | H04L 12/56 |

OTHER PUBLICATIONS

Ahmadi H. et al., "NBBS Traffic Management Overview", IBM Systems Journal, vol. 34, No. 4, Sep. 21, 1995, pp. 604–627.

Platt A. et al., "Traffic Management in Frame Relay Networks", Computer Networks and ISDN Systems, vol. 23, No. 4, Jan. 1, 1992, pp. 305–316.

*Primary Examiner*—Michael Horabik
*Assistant Examiner*—Kevin C. Harper
*Attorney, Agent, or Firm*—Gowling, Strathy & Henderson; Yoshiharu Toyooka

[57] ABSTRACT

The frame transfer priority (hereinafter called) FTP capability definition distinguishes between FTP indices and classes. Several FTP indices may be mapped into one or more FTP classes by a network and different networks may map differently FTP indices to classes. When a frame relay SVC traverses multiple networks it may not be clear what is the exact FTP it is assigned. The concept of frame transfer normalized priority (hereinafter called FTnP) overcomes this disadvantage. The FTnP is a precise and uniform measure of the FTP assigned to a frame relay SVC or PVC.

10 Claims, 3 Drawing Sheets

| N\C | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 1.00 | | | | | | | | | | | | | | | |
| 2 | .500 | 1.00 | | | | | | | | | | | | | | |
| 3 | .333 | .667 | 1.00 | | | | | | | | | | | | | |
| 4 | .250 | .500 | .750 | 1.00 | | | | | | | | | | | | |
| 5 | .200 | .400 | .600 | .800 | 1.00 | | | | | | | | | | | |
| 6 | .167 | .333 | .500 | .667 | .833 | 1.00 | | | | | | | | | | |
| 7 | .143 | .286 | .423 | .571 | .714 | .857 | 1.00 | | | | | | | | | |
| 8 | .125 | .250 | .375 | .500 | .625 | .750 | .875 | 1.00 | | | | | | | | |
| 9 | .111 | .222 | .333 | .444 | .556 | .667 | .778 | .889 | 1.00 | | | | | | | |
| 10 | .100 | .200 | .300 | .400 | .500 | .600 | .700 | .800 | .900 | 1.00 | | | | | | |
| 11 | .091 | .182 | .273 | .364 | .455 | .545 | .636 | .727 | .818 | .909 | 1.00 | | | | | |
| 12 | .083 | .166 | .250 | .333 | .417 | .500 | .583 | .666 | .750 | .833 | .917 | 1.00 | | | | |
| 13 | .077 | .154 | .231 | .308 | .385 | .462 | .538 | .615 | .692 | .769 | .845 | .923 | 1.00 | | | |
| 14 | .071 | .143 | .214 | .286 | .357 | .429 | .500 | .571 | .643 | .714 | .786 | .857 | .929 | 1.00 | | |
| 15 | .066 | .133 | .200 | .267 | .333 | .400 | .467 | .533 | .600 | .667 | .733 | .800 | .866 | .933 | 1.00 | |
| 16 | .063 | .125 | .188 | .250 | .313 | .375 | .438 | .500 | .563 | .625 | .688 | .750 | .813 | .875 | .936 | 1.00 |

Figure 1

| N\C | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 1 | | | | | | | | | | | | | | | |
| 2 | 2 | 2 | | | | | | | | | | | | | | |
| 3 | 3 | 3 | 3 | | | | | | | | | | | | | |
| 4 | 4 | 5 | 6 | 4 | | | | | | | | | | | | |
| 5 | 7 | 8 | 9 | 10 | 5 | | | | | | | | | | | |
| 6 | 11 | 12 | 13 | 14 | 15 | 6 | | | | | | | | | | |
| 7 | 16 | 17 | 18 | 19 | 20 | 21 | 7 | | | | | | | | | |
| 8 | 22 | 23 | 24 | 25 | 26 | 27 | 28 | 8 | | | | | | | | |
| 9 | 29 | 30 | 31 | 32 | 33 | 34 | 35 | 36 | 9 | | | | | | | |
| 10 | 37 | 38 | 39 | 40 | 41 | 42 | 43 | 44 | 45 | 10 | | | | | | |
| 11 | 46 | 47 | 48 | 49 | 50 | 51 | 52 | 53 | 54 | 55 | 11 | | | | | |
| 12 | 56 | 57 | 58 | 59 | 60 | 61 | 62 | 63 | 64 | 65 | 66 | 12 | | | | |
| 13 | 67 | 68 | 69 | 70 | 71 | 72 | 73 | 74 | 75 | 76 | 77 | 78 | 13 | | | |
| 14 | 78 | 80 | 81 | 82 | 83 | 84 | 85 | 86 | 87 | 88 | 89 | 90 | 91 | 14 | | |
| 15 | 92 | 93 | 94 | 95 | 96 | 97 | 98 | 99 | 100 | 101 | 102 | 103 | 104 | 105 | 15 | |
| 16 | 106 | 107 | 108 | 109 | 110 | 111 | 112 | 113 | 114 | 115 | 116 | 117 | 118 | 119 | 120 | 16 |
| | 121 | 122 | 123 | 124 | 125 | 126 | 127 | 128 | 129 | 130 | 131 | 132 | 133 | 134 | 135 | 136 |

*Figure 2*

FRAME TRANSFER NORMALIZED PRIORITY

This application claims benefit of provisional application No. 60/028,858 filed Sep. 16, 1996.

FIELD OF INVENTION

The invention resides in a telecommunications network in which frames of data are transported according to a certain priority scheme. More particularly, in a frame relay network, the invention facilitates determination of an appropriate priority service which may be acceptable to systems involved in a connection.

BACKGROUND OF INVENTION

In the frame relay networks, the Frame Transfer Priority (hereinafter called FTP) service definition distinguishes between FTP indices and FTP classes. A frame transfer priority index identifies in the setup message the user's request for a frame transfer priority to be assigned to the SVC (Switched Virtual Connection). An FTP index is an integer taking a value from 0 to 15. The higher the FTP index, the higher the priority of the requested FTP service.

An FTP class allows a network to distinguish between frame relay SVCs and PVCs according to the FTP services to which they are assigned during call establishment (in the case of SVC) or provisioning (in the case of PVC). When a frame relay SVC enters the active state, frames of SVCs assigned to a high FTP class are processed and transmitted before SVC frames assigned to lower FTP classes. There are a maximum of 16 different FTP classes.

A salient aspect of the FTP capability definition is the decoupling between FTP indices and classes. The reason for this decoupling is to provide service providers with flexibility to tailor the FTP capability for customers needs. With the distinction between FTP indices and classes, a service provider will be able to support a number of FTP classes of its choice while at the same time accepting 16 different FTP indices. It is therefore clear that when less than 16 FTP classes are supported, several FTP indices will have to be grouped into one or more FTP classes.

The decoupling between FTP indices and classes, however, creates the following disadvantages:

According to the FTP capability definition, it is not possible to infer from the FTP index the frame transfer priority to be assigned to a SVC. Of course this information can be obtained from the service provider of a user.

Different networks may map the same FTP index to different FTP classes. When a SVC has to traverse multiple networks, the exact FTP service assigned to the SVC is not clear. This problem of mapping differences may be resolved to provide a homogenous FTP service but it requires prearranged bilateral agreements between network operators.

The invention addresses to this problem of the decoupling between FTP indices and classes. The invention introduces a parameter called frame transfer normalized priority (hereinafter called FTnP) which is a precise and uniform measure of the FTP service assigned to a frame relay SVC or PVC. It removes the influence caused by the number of FTP classes which can vary from one network to another and by the multiple mappings of FTP indices to classes.

OBJECTS OF INVENTION

It is therefore an object of the invention to provide a scheme which a network can use to obtain a precise measure of a transfer service requested by a user.

It is another object of the invention to provide a method of obtaining a precise measure of a requested transfer service to determine a call or connection is to be accepted.

It is a further object of the invention to provide a method of deriving a parameter of a requested transfer service which is precise and uniform among different networks.

SUMMARY OF INVENTION

Briefly stated, the invention reside in a telecommunications network in which frames are transported according to a frame transfer priority class hereinafter called FTP class assigned to a connection. According to one aspect, the invention is directed to a method of determining an appropriate FTP class which is acceptable to an FTP system making up the connection. The method comprises steps of (1) receiving from a source of the frames a frame transfer priority index hereinafter called FTP index indicative of a priority level desired by the source and (2) calculating a frame transfer normalized priority hereinafter called FTnP of the FTP system using the FTP index and a total number of FTP classes supported by the FTP system. The method includes a further step of (3) determining the appropriate FTP class which satisfy the FTP index using the FTnP calculated in step (2).

According to a further aspect, the invention resides in a telecommunications network comprising two or more FTP systems in each of which systems frames are transported according to a frame transfer priority class hereinafter called FTP class assigned to a connection. A method of determining an appropriate FTP class which is acceptable to an FTP system making up the connection comprises steps of (1) receiving from a source of the frames a frame transfer priority index hereinafter called FTP index indicative of a priority level desired by the source and (2) calculating at a first FTP system a frame transfer normalized priority hereinafter called FTnP of the first FTP system using the FTP index and a total number of FTP classes supported by the first FTP system. The method further includes steps of (3) calculating at a second FTP system an FTnP of the second FTP system using the FTP index and a total number of FTP classes supported by the second FTP system; and (4) determining the appropriate FTP class which satisfy the FTP index and is acceptable to the second FTP system using the FTnP calculated in steps (2) and (3).

In accordance with a yet another aspect, the invention is directed to a method of determining an appropriate FTP class which is acceptable to an FTP system making up the connection which comprises steps of (1) receiving from a source a connection request indicating a frame transfer priority index hereinafter called FTP index; (2) calculating at a first FTP system a frame transfer normalized priority hereinafter called FTnP of the first FTP system using the FTP index and a total number of FTP classes supported by the first FTP system and assigning a rank corresponding to the FTnP and (3) calculating at a second FTP system an FTnP of the second FTP system using the FTP index and a total number of FTP classes supported by the second FTP system. The method further includes steps of (4) calculating at the second FTP system the FTnP of the first system using the rank corresponding thereto; (5) determining at the second FTP system if the connection request can be accepted based upon the FTnP of the first and second FTP systems; and (6) determining at the second FTP system the appropriate FTP class which satisfy the FTP index and is acceptable to the second FTP system using the FTnP calculated in steps (3) if the connection request is determined to be acceptable.

BRIEF DESCRIPTION OF DRAWINGS

FIG. 1 shows values of frame transfer normalized priority;

FIG. 2 shows ranks of frame transfer normalized priority;

DETAILED DESCRIPTION OF PREFERRED EMBODIMENTS OF INVENTION

Figure 3:
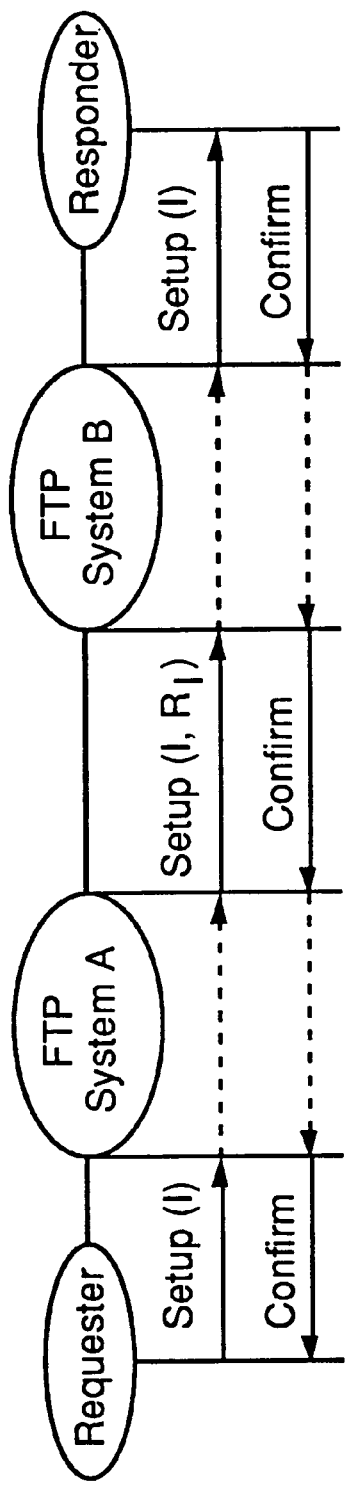
FIG. 3 shows schematically the establishment phase of a SVC between two heterogeneous systems.

Table 1 below illustrates problems which may be caused by decoupling of FTP classes and indices. An example shown in Table 1 has three FTP systems A, B and C in which they group the 16 FTP indices differently into 3 FTP classes.

TABLE 1

| FTP class | System A grouping of FTP indices | System B grouping of FTP indices | System C grouping of FTP indices |
| --- | --- | --- | --- |
| 1 | 0,1,2,3,4 | 0,1,...,10 | 0,1 |
| 2 | 5,...,10 | 11,12 | 2,3 |
| 3 | 11,...,15 | 13,14,15 | 4,5,...,15 |

It is assumed that each system alone provides a good FTP service to its users. The service each system provides, however, may be affected when more than one system is involved in a connection because each maps the FTP indices differently. For example, referring to Table 1, in system C, FTP index 5 is assigned to the highest priority class whereas in system B it is assigned to the lowest class and in system A the middle class. Clearly a SVC requesting a FTP index of 5 will not get the same preferential frame transfer treatment from each system. As will be described in detail below, the concept of the frame transfer normalized priority FTnP addresses this inconsistent preferential transfer treatment as one of the uses of the invention.

The frame transfer normalized priority (FTnP) is the ratio of the FTP class C assigned to an FTP index I to the total number of FTP classes N.

$$FTnP = C/N$$

where:

C is the FTP class ($1 \leq C \leq 16$) assigned to a FTP index I ($0 \leq I \leq 15$), N is the total number of FTP classes supported by a frame relay network system ($1 \leq N \leq 16$), and FTnP is a positive number less than or equal to 1.

FIG. 1 shows the FTnP for all possible C/N combinations, rounded at the third decimal, when necessary. Each row of FIG. 1 corresponds to the maximum number N (N=1 to 16) of FTP classes supported by a network or a network node and each column corresponds to one FTP class. For each row there are a maximum of N columns, one per FTP class. Each entry of FIG. 1 corresponds to the ratio C/N equal to the FTnP of the ordered set of FTP indices assigned to class C.

In a network of FTP systems, the FTnP is used to signal the required FTP between heterogeneous systems (i.e. systems using a different number of FTP classes or different grouping of FTP indices). The requesting FTP system selects a FTP class according to the FTP index received from its user and its own mapping between FTP indices and classes. The receiving FTP system, if it accepts the request, will assign it to the best matching FTP class. The best matching FTP class is defined as follows:

The lowest FTP class among FTP classes at the receiving system for which $FTnP_S \leq FTnPR$ $FTnP_S$ is the FTnP received from the requesting FTP system and $FTnP_R$ is the FTnP of the receiving system which can honor the request. The best matching FTP class to be assigned to the FTP request is, therefore, a class whose FTnP is equal to or higher than that assigned by the requesting FTP system.

According to a further embodiment, FTnP are ranked and the ranks are used instead of FTnP values to signal the required FTP between heterogeneous systems. The rank R of a FTnP is the position in FIG. 1, computed using the following formula:

$$R = \Sigma_{I=1 \; to \; X-1} I + Y$$

X corresponds to the row and Y to the column where a particular FTnP is located in FIG. 1. FIG. 2 shows the rank of each of the 136 FTnP values computed by the above formula. For example the rank of FTnP=0.600 located at the intersection of row X=5 and column Y=3 is R=(1+2+3+4)+3=13.

Knowing the rank R of a FTnP, the following algorithm can be used to retrieve X and Y:

Algorithm FindXY(Input R: Integer, Output X, Y: Integer)

Purpose:

This algorithm derives the row X and the column Y in FIG. 1 from the rank R of a FTnP. This two values X and Y correspond respectively to the FTP class and the total number of FTP classes used to compute the FTnP of a FTP request.

Local variables

Boolean Continue:=true;

Integer

I:=1 {I is a row of FIG. $1 \leq I \leq 16$},

S:=1 {S is the sum of the contents of rows 1, 2, ..., I (i.e., S is equal to $\Sigma_{i=1 \; to \; I} i$)}

Begin

{It is assumed that R is a valid rank taking a value from 1 to 136}

While Continue do

If $R-S \leq 0$ Then {X and Y have been found}

Begin

X:=I,

Y:=I-(S-Z);

Continue:=false;

End

Else {R-S must be greater than 0 which means that X and Y have not been found}

Begin

I:=I+1;

S:=S+I;

End

Return (X, Y);

End.

Tolerance Factor

Although the FTnP of a FTP request assigned by the requesting FTP system is made known to it, a receiving FTP system may not necessarily honor the request since its own mapping of FTP indices into classes may be severely different from the one of the requesting FTP system. A measure known as the tolerance factor can be used to decide whether or not a request can be accepted.

In a network of heterogeneous FTP systems in order to protect a FTP system against the influence of other FTP systems, the tolerance factor τ is used to determine whether or not an FTP request may be granted. The tolerance factor τ is the degree by which an FTP system will accept or reject an FTP request assigned to a higher FTnP by another FTP system.

To determine whether to accept the FTP request from another FTP system, a receiving FTP system performs the following test:

For FTP request I
if $(FTnP_S-FTnP_R)>\tau$
then Reject FTP request else FTP request may be accepted $FTnP_S$ is the FTnP assigned to FTP index I by the sending (requesting)
FTP system and $FTnP_R$ is the FTnP assigned by the receiving FTP system.
τ is such that $0 \leq \tau \leq 1$.

There are three cases to consider:
(1) If τ=0 the receiving FTP system will reject any request from another system mapping differently the FTP indices into classes.
(2) If τ=1 the receiving FTP system will always accept any request from another system independently of their respective mapping of FTP indices into classes.
(3) If 0<τ<1 there are cases where the receiving FTP system will accept requests from other systems and cases where it will not. The close τ is to 1, the higher the number of requests a receiving FTP system will accept from another different FTP system.

Several examples involving two FTP systems to illustrate the role of the tolerance factor τ and the concept of best matching FTP class will be described below.

EXAMPLE 1

Referring to Table 2 below, the requesting FTP system is system B and the receiving FTP system is system A.

TABLE 2

| FTP class | FTnP | System A grouping of FTP indices | System B grouping of FTP indices |
|---|---|---|---|
| 1 | .333 | 0,1,2,3,4 | 0,1 |
| 2 | .667 | 5,...,10 | 2,3 |
| 3 | 1.00 | 11,...,15 | 4,5,...,15 |

The FTP index of request is I=4. For I=4 $FTnP_A$ is 0.333 and $FTnP_B$ is 1.00. System B assigns a higher FTnP to index 4 than system A. Depending on how FTP system A is engineered, it may or may not accept the request from system B since only FTP indices 11 to 15 are assigned an FTnP of 1.00. The value of τ which is chosen according to the engineering of FTP system A determines whether the request will be accepted. For example if τ is 0.400 the request will be rejected since 1.00−0.333>0.400. However, if it is 0.7, the request will be accepted.

If the request is accepted by system A it will be assigned to the best matching class $C_A=3$ since it is the lowest FTP class of system A for which $FTnP_B=1.00 \leq FTnP_A=1.00$.

Let us consider the situation from the opposite direction. The requesting FTP system is system A. System B will accept the request since for I=4 $FTnP_A<FTnP_B$. The request will be assigned the best matching class $C_B=1$ since it is the lowest FTP class for which for I=4 $FTnP_A=0.333 \leq FTnP_B=0.333$.

EXAMPLE 2

Referring to Table 3, system D is the receiver and system C is requester.

TABLE 3

| FTP class | $FTnP_C$ | System C grouping of FTP indices | $FTnP_D$ | System D grouping of indices |
|---|---|---|---|---|
| 1 | .250 | 0,1,2,3 | .167 | 0,1,2 |
| 2 | .500 | 4,5,6,7 | .333 | 3,4,5 |
| 3 | .750 | 8,9,10,11 | .500 | 6,7,8 |
| 4 | 1.00 | 12,13,14,15 | .667 | 9,10,11 |
| 5 | — | — | .833 | 12,13 |
| 6 | — | — | 1.00 | 14,15 |

The FTP request by system C is for I=7. For I=7 $FTnP_C=0.500=FTnP_D=0.500$. The request will be accepted by system D and it will be assigned to the best matching class $C_D=3$ since it is the lowest FTP class of system D for which $FTnP_C=0.500 \leq FTnP_D=0.500$.

Let us consider another request from system C with I=9 and $FTnP_C=0.750>FTnP_D=0.667$. $FTnP_C-FTnP_D 0.083$. If $\tau_D \leq 0.083$, the request will be accepted by system D otherwise it will be reject. If the request is accepted by system D it will be assigned to the best matching class $C_D=5$ since it is the lowest FTP class of system D for which $FTnP_C=0.750 \leq FTnP_D=0.833$.

Now consider the same request by from the opposite direction. System D is the requesting system and I=9. $FTnP_D=0.667<FTnP_C=0.750$. The request will be accepted by system C and assigned to the best matching class $C_C=3$ since it is the lowest FTP class of system C for which $FTnP_D=0.667 \leq FTnP_C=0.750$.

Protocol between heterogeneous FTP systems

Figure 4:
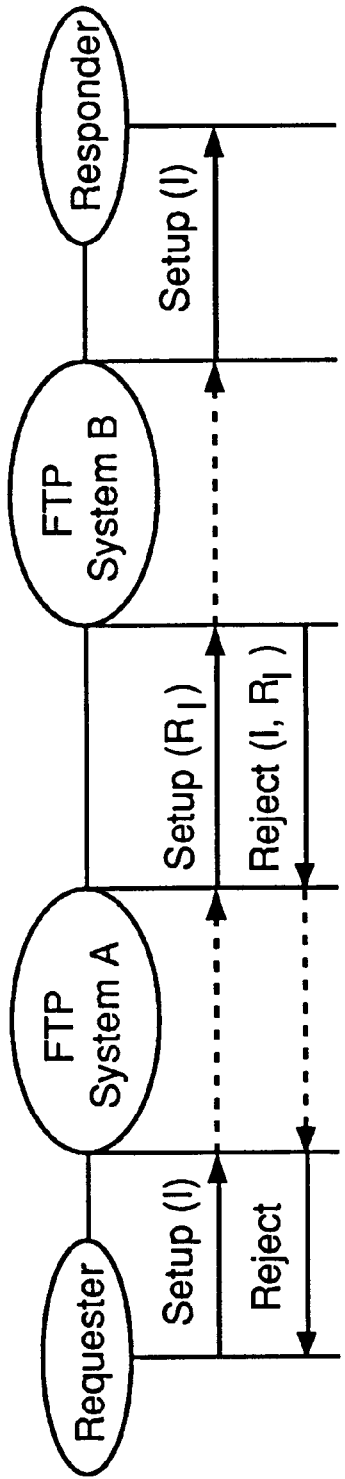
FIG. 4 shows schematically the rejection of by FTP system B of a SVC establishment request.

FIGS. 3 and 4 show two heterogeneous FTP systems where the rank R of the FTnP assigned to the FTP index is used. Using the FTnP rank in addition to the FTP index by different systems allows the systems to assign the same FTP (or very close FTP) to the frame relay SVC which is not always possible if they use the FTP index only. FIG. 3 shows the protocol message flows for the case where the SVC establishment request is accepted by both FTP systems. FIG. 4 shows the protocol message flows for the case where FTP system B rejects the request.

Request phase

Actions by the requester:

The requester (a user of FTP system A) has to supply the FTP index corresponding to the desired FTP. The information indicating how FTP indices are assigned to different FTPs is obtained by the requester from its serving system prior to the establishment request.

Actions by FTP system A:

At the reception of the setup message from the requester specifying FTP index I for the SVC, FTP system A will proceed as follows (assuming of course it can satisfy it):
(1) Find the FTP class $C_A$ assigned to I.
(2) Determine the rank $R_I$ from FIG. 2 using $C_A$ and $N_A$ (the total number of FTP classes system A supports).
(3) Send a setup message to FTP system B including the FTP index I received from the requester and FTnP rank $R_I$ found in step 2.

Actions by FTP system B:

At the reception of the setup message from FTP system A specifying a FTP index I and a FTnP rank $R_I$, FTP system B will proceed as follows:
(1) Retrieve the values $C_A$ and $N_A$ from $R_I$ using algorithm FindXY ($C_A$ corresponds to X and $N_A$ to Y in FindXY) described above or an equivalent one.
(2) Compute $FTnP_A=C_A/N_A$
(3) Find the FTP class $C_I$ it has assigned to FTP index I.

(4) Compute $FTnP_I = C_I/N_B$ (5) Use the tolerance factor $\tau$ to determine whether to accept or reject the request. If $FTnP_A - FTnP_I > \tau$ then reject the request else accept the request.

(6a) If in step 5 it was determined that the request can be accepted then find the best matching class $C_B$ for which $FTnP_A \leq FTnP_B$.

(7) Assign FTP Class $C_B$ to the FTP request (8a) Progress the establishment request towards the responder (FIG. 3)

(8b) If in step 5 it was determined that the request can not be accepted then return a Reject message to FTP system A (FIG. 4)

Confirmation phase (FIG. 3)

Actions by the responder

The actions by the responder are according to X.36 FTP specification.

Actions by FTP system B:

Upon receiving a Confirm message from the responder, FTP system B shall send a Confirm message to FTP system A.

Actions by FTP system A:

Upon receiving a Confirm message from FTP system B, FTP system A shall send a Confirm message to the requester.

Rejection by responder

To reject a FTP request, a Reject message is returned by the responder to FTP system B, by FTP system B to FTP system A and by FTP system A to the requester.

Dominant FTP system

What happens in terms of signaling when there are more than two communicating FTP systems? More precisely which information is passed from one system to the next one during the set up phase? Since the requester selects a FTP index according to the information provided by its serving system, each FTP system passes to the next FTP system, the index supplied by the requester and the FTnP rank supplied by the FTP system serving the requester. It is because the request (i.e. the FTP index) is formulated according to the characteristics of the service of the FTP system serving the requester, the serving FTP system defines, in a sense, the FTP assigned to a FTP index. Hence the FTnP it assigns to the FTP index must be communicated to other FTP systems to provide a uniform precedence service. For this reason, the FTP system serving the requester is called the dominant FTP system.

What I claim is:

1. In a telecommunications network in which frames are transported according to a frame transfer priority class hereinafter called FTP class assigned to a connection, a method of determining an appropriate FTP class which is acceptable to an FTP system making up the connection comprising steps of:

(1) receiving from a source of the frames a frame transfer priority index hereinafter called FTP index indicative of a priority level desired by the source;

(2) calculating a frame transfer normalized priority hereinafter called FTnP of the FTP system using the FTP index and a total number of FTP classes supported by the FTP system, and (3) determining the appropriate FTP class which satisfy the FTP index using the FTnP calculated in step (2).

2. In a telecommunications network comprising two or more FTP systems in each of which systems frames are transported according to a frame transfer priority class hereinafter called FTP class assigned to a connection, a method of determining an appropriate FTP class which is acceptable to an FTP system making up the connection comprising steps of:

(1) receiving from a source of the frames a frame transfer priority index hereinafter called FTP index indicative of a priority level desired by the source;

(2) calculating at a first FTP system a frame transfer normalized priority hereinafter called FTnP of the first FTP system using the FTP index and a total number of FTP classes supported by the first FTP system, (3) calculating at a second FTP system an FTnP of the second FTP system using the FTP index and a total number of FTP classes supported by the second FTP system; and (4) determining the appropriate FTP class which satisfy the FTP index and is acceptable to the second FTP system using the FTnP calculated in steps (2) and (3).

3. The method according to claim 2 comprising further steps of:

mapping at the first FTP system an FTP class to the connection according to the FTP index received from the source; and determining at the second FTP system the best matching FTP class which is the class equal to or higher than the FTP class mapped at the first FTP system.

4. The method according to claim 3 wherein the best matching FTP class is selected in accordance with the following criteria that;

the best matching FTP class is the lowest FTP class among FTP classes of the second FTP system for which $FTnPa \leq FTnPb$, wherein FTnPa is the FTnP received from the first FTP system and FTnPb is the FTnP of the second FTP system.

5. The method according to claim 2 comprising further steps of:

(5) calculating at a third and/or subsequent FTP system an FTnP of the third and/or subsequent FTP system using the FTP index and a total number of FTP classes supported by the third and/or subsequent FTP system; and (6) determining the appropriate FTP class which satisfy the FTP index and is acceptable to the third and/or subsequent FTP system using FTnP calculated in steps (5) and (6).

6. The method according to claim 5 comprising further steps of:

mapping at the first FTP system an FTP class to the connection according to FTP index received from the source; and determining at the third and/or subsequent FTP system the best matching FTP class which is the class equal to or higher than the FTP class mapped at the first FTP system.

7. The method according to claim 6 wherein the best matching FTP class is selected in accordance with the following criteria that;

the best matching FTP class is the lowest FTP class among FTP classes of the third and/or subsequent FTP system for which $FTnPa \leq FTnPc$, wherein FTnPa is the FTnP received from the first FTP system and FTnPc is the FTnP of the third and/or subsequent FTP system.

8. In a telecommunications network comprising two or more FTP systems in each of which systems frames are transported according to a frame transfer priority class hereinafter called FTP class assigned to a connection, a method of determining an appropriate FTP class which is acceptable to an FTP system making up the connection comprising steps of:

(1) receiving from a source a connection request indicating a frame transfer priority index hereinafter called FTP index;

(2) calculating at a first FTP system a frame transfer normalized priority hereinafter called FTnP of the first FTP system using the FTP index and a total number of FTP classes supported by the first FTP system and assigning a rank corresponding to the FTnP;

(3) calculating at a second FTP system an FTnP of the second FTP system using the FTP index and a total number of FTP classes supported by the second FTP system;

(4) calculating at the second FTP system the FTnP of the first system using the rank corresponding thereto;

(5) determining at the second FTP system if the connection request can be accepted based upon the FTnP of the first and second FTP systems; and (6) determining at the second FTP system the appropriate FTP class which satisfy the FTP index and is acceptable to the second FTP system using the FTnP calculated in steps (3) if the connection request is determined to be acceptable.

9. The method according to claim 8 comprising further steps of:

obtaining from the rank received from the first FTP system an FTP class assigned by the first FTP system and the total number of FTP classes supported by the first FTP system, and deriving the FTnP calculated by the first FTP system.

10. The method according to claim 8 comprising further a step of:

performing steps (3) to (6) at a third and/or subsequent FTP systems.

* * * * *